Patented July 6, 1954

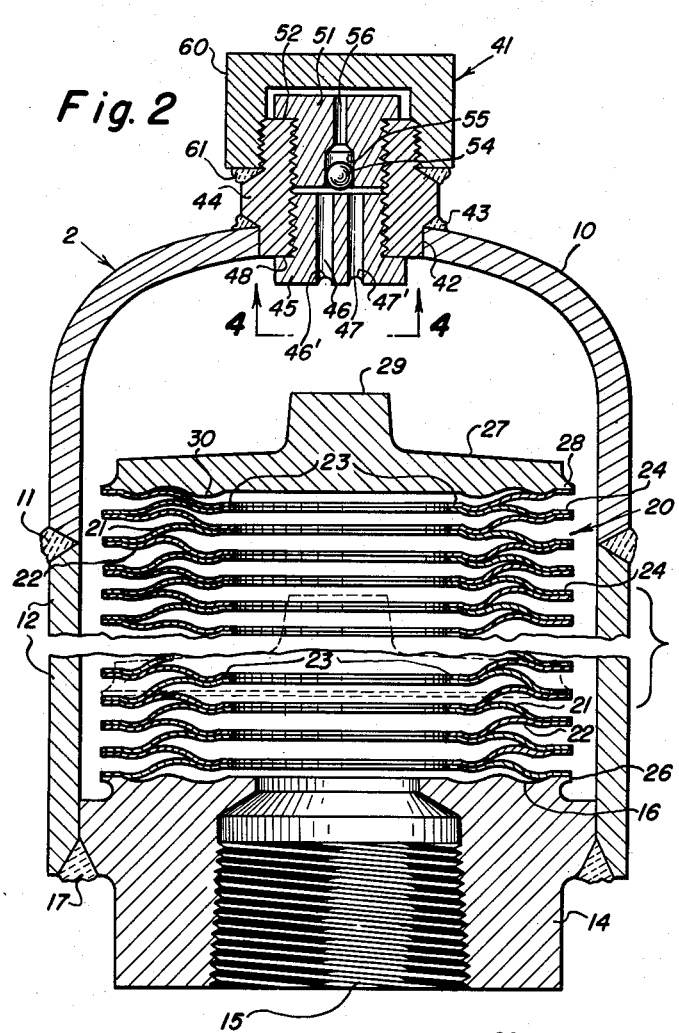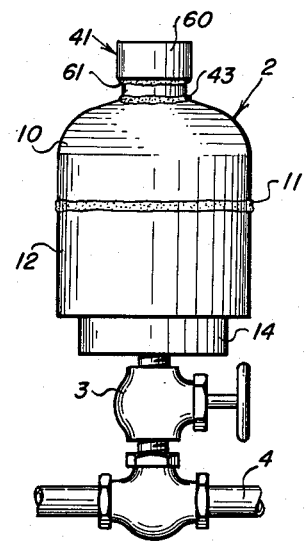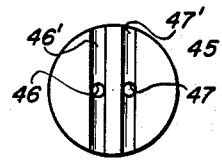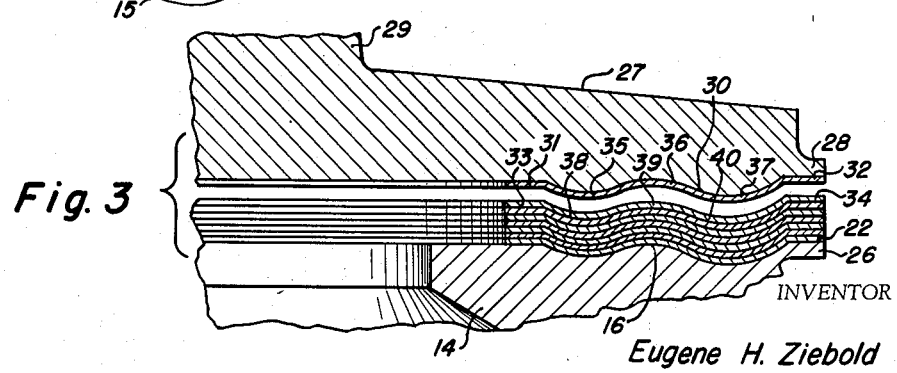
INVENTOR
Eugene H. Ziebold

2,682,893

UNITED STATES PATENT OFFICE

2,682,893

SURGE ARRESTOR

Eugene H. Ziebold, La Jolla, Calif., assignor to Solar Aircraft Company, San Diego, Calif., a corporation of California Application May 16, 1950, Serial No. 162,352

5 Claims. (Cl. 138—30)

This invention relates to a pressure surge arrestor for use in fluid flow systems and, more particularly, to a surge arrestor that will effectively arrest high frequency surges in the millisecond range as well as lower frequency surges.

The high velocity surge power of liquid hammer causes damage to instruments and equipment, dangerous excessive stresses in piping systems and costly leaks and shut-downs due to breakage.

Liquid hammer is kinetic energy capable of huge amounts of work. This abrupt shock energy wave is released in powerful milli-second high pressure oscillations. It generally manifests itself in jerky audible harmonic impulses due to the natural vibration frequencies of the piping equipment. Many times multi-source shock waves of different frequencies are present and produce an even greater destructive force known as "beat" shock.

Whether liquid hammer is a steady vibration or a series of sledge-hammer blows, fatigue and damage will finally take place necessitating the replacement of instruments and equipment. This results in excessive maintenance costs, loss of production and increased overhead due to downtime.

Among the many prior efforts and failures to arrest such surges, including water and fluid hammer of various types, one of the oldest and simplest is the provision of an air-dome which has the difficulty that the air is gradually absorbed by the liquid and its capacity is thereby eliminated, and furthermore, the dampening effect is very limited because there is little dissipation of energy in the cycle. Jacuzzi proposed an aspirator to entrain new air in domes for arresting low pressure surges to balance the absorption rate, but this system is not applicable to higher pressures and, in certain instances, air or even inert gases are deleterious to fluids flowing in the lines subject to surges.

Global-type actuators consisting of two hemispheres with very flexible neoprene rubber or other highly flexible diaphragms have also been proposed. Such devices also dissipate little energy, and gradually lose their charge through the membranes and need periodic recharging. Also, the membrane materials are insufficiently flexible for various low-temperature operations and are subject to attack by glycols and certain oils and by certain chemicals which are pumped through lines subject to surge.

Pressure surge arrestors comprising a flexible bellows or like expansible and contractible units in pressurized casings have also been provided. Such prior surge arrestors, however, lacked sufficient structural rigidity to withstand pressures and pressure changes of considerable magnitude, and sufficient flexibility to effectively dampen rapid fluctuations in line pressures.

Prior attempts to structurally increase resistance of the prior bellows to crushing forces have resulted in reduction of bellows flexibility. It has also been proposed to provide internal mechanical support for the bellows, but this expedient has proved mainly ineffective since it is difficult to adequately support the irregular bellows walls. Consequently, it has not been possible in prior devices of this type to preload for high pressure service and at the same time provide a sensitive device because such preloading would crush or deform the bellows.

My present invention provides bellows-type surge arrestors not subject to the foregoing disadvantages, which may be preloaded at the factory for high pressure, high frequency surge arrestor service.

The surge arrestor of my invention is especially adapted for the smoothing of split-second shock waves, known as water or liquid hammer, in pipe lines at the outlets of devices such as reciprocating pumps, quick closing valves or other sharply varying velocity current producing apparatus. The surge arrestor of my invention smooths out these sharply varying pressure changes by expanding immediately in response to pressure increases whereby the shock wave amplitude is considerably reduced during passage through the device.

It is highly advantageous that the surge arrestor can be preloaded during factory assembly. The procedure, which is ideally suited to factory production techniques, obviates the necessity for highly skilled, expensively equipped field crews. Factory-sealed preload is further desirable in that it allows removal and reinstallation of the arrestor without loss and the need for re-establishment of preload pressures. Bellows strength is of the utmost importance here since the bellows must be able to withstand the full preloading pressure which cannot be offset by a balancing internal pressure until installation.

The present invention therefore comprises a surge arrestor wherein the flexible unit may be readily completely collapsed to a position wherein it resists further deformation thereby enabling it to be accurately preloaded and sealed at the factory. A preferred structural embodiment will be described hereinafter, as well as preferred procedure in preloading.

Accordingly, it is an object of this invention to provide a novel pressure surge arrestor which will withstand high pressures up to the bursting point of the line to which it is attached and have the flexibility necessary to dampen even extremely rapid pressure variations in the line.

It is a further object to provide a novel surge arrestor which may be factory preloaded without damage to the flexible unit of the device.

It is another object to provide a novel surge arrestor arrangement which can be disconnected from the line without loss of preload or line pressure.

It is a further object to provide a novel surge arrestor in which rupture or leakage of the bellows does not cause loss of main line pressure.

It is a further object to provide novel bellows construction in a pressure surge arrestor.

It is a further object to provide a novel, simple and efficient means and method for preloading a surge arrestor.

Other objects and advantages will become apparent from a consideration of the following description and the accompanying drawings in which:

Figure 1 diagrammatically illustrates a typical installation of the pressure surge arrestor;

Figure 2 is an axial section through a surge arrestor according to a preferred embodiment of the invention; and Figure 3 is a fragmentary section illustrating part of the device of Figure 2 with the bellows elements collapsed, and Figure 4 is a bottom plan view of one of the elements of the device of Figure 2.

Referring briefly to Figure 1, a pressure surge arrester bell housing 2 is connected through a valve 3 to pipe line 4 which carries a fluid subjected to fluctuating high pressures. The valve 3 is of any suitable type and enables the entire surge arrestor to be disconnected from line 4 without loss of line pressure.

Referring to Figure 2, a dome-like housing 10 is welded at 11 to cylindrical body 12. A base 14 having a central threaded aperture 15 and an inner bellows seating surface 16 is sealingly secured to body 12, as by annular weld 17.

An axially expansible container or bellows 20 is formed by a series of annular plates 21 and 22 welded at their inner and outer peripheries at inner and outer annular flat peripheral surfaces 23 and 24. Bellows 20 is attached to base 14 at 26 and its upper end is closed by securing it to end plate 27 at the flat zone 28. Plate 27 is provided on its top with a projecting boss 29 and on its bottom with annular curved belows contacting surface 30.

Each convolution of bellows 20 comprises an upper diaphragm plate 21 and a lower diaphragm plate 22. Preferably both diaphragm plates are of stainless steel. Diaphragm plate 21 comprises inner and outer annular zones 31 and 32 that are flat and perpendicular to the axis of bellows 20. Diaphragm plate 22 comprises similar inner and outer annular zones 33 and 34. These zones provide the necessary area for attachment, as by welding, of the adjacent diaphragm plates to each other and to end plate 27 and base 14 so as to provide a gas tight bellows unit.

Intermediate its flat attachment zones, diaphragm plate 21 is formed in radial succession with annular zones 35, 36 and 37 that are curved radially and similarly but with middle zone 36 curved reversely with respect to zones 35 and 37. Similarly, diaphragm plate 22 is formed with intermediate radially curved zones 38, 39 and 40.

The curvature of lower surface 30 of end plate 27 is such that when the bellows is collapsed, the uppermost diaphragm plate 21 will seat thereupon in full surface contact. The shape of upper surface 16 of base 14 is such that when the bellows is collapsed, the lowermost diaphragm plate 22 will seat thereon in full surface contact. The curvatures of the preformed diaphragm plates 21 and 22 are such that when the bellows is fully collapsed, each diaphragm plate will nest in metal contact with the one above and below it and provide a solid stack of metal plates. This permits the preloading pressure to become as high as the expected line pressure without damaging the bellows. Thus when the bellows 20 is collapsed, its axial and radial resistances to crushing stress are those of a heavy solid metal ring.

The space between bellows 20 and the interior of the surrounding casing is preloaded to a predetermined high pressure and sealed before the device leaves the factory. The pressurized fluids are introduced through the preloading head 41 atop dome 10.

Dome 10 is formed with an aperture 42 in which is sealed, as by weld 43, an internally threaded collar 44. A threaded plug 45 formed with spaced internal passages 46 and 47 communicating at their lower ends with grooves 46' and 47', respectively (Figure 4), is mounted within the inner end of collar 44 with shoulder 48 limiting its outward movement. A threaded valve member 51, provided with a shoulder 52, abutting the outer end of collar 44, is mounted on collar 44 axially outwardly of plug 45 and carries a conventional ball check valve 54 in enlargement 55 of internal bore 56. A sealing cap 60 is externally threaded onto collar 44 and welded to it at 61 when the preloading operation has been completed.

To preload my improved surge arrestor, valve member 51 and sealing cap 60 are removed, and bellows 20 is fully extended axially and held there by the application of internal mechanical or fluid force through bore 15. Then the space between the casing and bellows 20 is filled through passages 46 and 46' with oil or any similar non-compressible liquid of low viscosity, passages 47 and 47' serving as an air vent during this operation. For low temperature operation, glycol may be used.

Valve member 51 and valve 54 are then assembled on collar 44. The internal support of bellows 20 is removed and a suitable compressible fluid such as nitrogen or another inert gas which does not tend to emulsify as would air is then introduced into the space through valve 54. Immediately bellows 20 is completely collapsed to the position of Figure 3 and the dotted line position of Figure 2 and the liquid surrounding the bellows is squeezed out of the spaces between the flexible diaphragm plates and forms a pool about the collapsed bellows and above the head plate 27.

The compressible fluid is supplied and compressed within the chamber about the bellows until any desired preload pressure is obtained. Sealing cap 60 is then welded in place to make the device entirely gastight, and the arrestor is ready for installation in a suitable pipe line.

In practice, the preload pressure within the bell 2 is slightly below the minimum expected working pressure. This will take care of possible increases in pressure due to temperature changes.

Prior to installation, the bellows 20 is collapsed flat with its parts in solid metal to metal contact. Upon installation, the slightly higher line pressure will expand the bellows slightly until a point of balance is reached, which balance is maintained until the line pressure changes. Even a slight drop in line pressure will permit complete collapse of the bellows, and substantially the full range of bellows expansion is available during line pressure increases. The pressures within and without the bellows 20 are thus always balanced during actual operation when the line pressures are at or above expected pressure, and even when the surge arrestor is removed from the line and ambient air pressure enters the bellows, the high pressure inside sealed bell 2 is maintained and does not injure the bellows.

The pressure of the inert gas (nitrogen) above the fluid (oil or anti-freeze solution) should be approximately the same as line pressure. When unit is installed in line, the pressure on either side of the bellows is balanced in the fully compressed position. When a line surge occurs, the pressure balance is equal to the pressure of the surge. This condition is not a jolt to the bellows since it is working against a gas cushion. As the bellows moves upward, it provides a volumetric relief to the surge side of the line—thereby tending to lower the surge pressure. In so doing it is accomplishing a certain amount of work—thereby absorbing kinetic energy from the energy of the surge. Since the bellows has an extremely low spring rate in order that it may be highly responsive to the slightest pressure rises in the line, it will move with the slightest fluctuation of line pressure. Even though the spring rate of the bellows is low, this is advantageous.

As the bellows moves upward, fluid in the chamber flows into the interstices of the bellows. This continues until the peak surge is satisfied. As the surge pressure recedes, the bellows tends to collapse. In so doing it must expel the oil from the interstices. Due to the wavy surface of the bellows, the expulsion is turbulent and this results in a slight delay in complete return to compressed position, which is the line pressure condition. This also requires energy and this delayed pressure return in addition will impose the down side of the wave on the rising side of the new on-coming wave, and this interference results in a dampening or neutralizing effect.

On decavitational surge lines, the velocity of flow and the rapidity of surge frequency will cause the pressure in the line, at certain points during this cycle, to drop below normal line pressure. In such cases it is necessary to load the surge arrestor initially at a pressure less than line pressure. This means that when the arrestor is connected into the line the bellows assumes a partially expanded position (due to pressure equalization). Now when the decavitation cycle of the surge occurs, the bellows will travel toward a compressed position, but its functioning is the same as described for pressure surges.

Rupture of the bellows by over-extension is impossible in my construction since, at full extension (a condition not practically obtainable in use), the bellows would be completely surrounded by substantially incompressible fluid.

It should be noted that in the event of bellows rupture or leakage, the main pipe line 4 is always sealed against fluid loss by the welded sealed bell 2. This feature is of particular importance when the line fluid is highly corrosive or poisonous.

The surge arrestor of this invention, although a small compact device, is capable of absorbing and dampening relatively large shocks, such as water or other liquid hammer, because the inert gas compressed within bell 2 follows the gas laws in that its pressure is inversely proportional to volume. Since the space within the bell 2 is initially filled with incompressible liquid with the bellows fully expanded, theoretically the gas pressure within the bell could become infinitely high, should the bellows become fully expanded during operation. As a matter of fact, however, the proportionately increasing resistance of the gas to further compression as the bellows expands cushions and slows bellows movements and eventually prevents full extension. Bell 2 is of such strength as not to expand appreciably under the working pressures.

The surge arrestor of the invention is usually placed as near the source of hammer as possible in the pipe line. For example, in a pipe line wherein shock waves may be set up due to action of a reciprocating pump, the surge arrestor is placed near the pump outlet, and a relatively smooth flow in the pipe line is assured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. The method of preloading a pressure surge arrestor having a variable space between an outer rigid housing and an inner expansible bellows, comprising the steps of expanding the bellows fully, filling the said space with an incompressible liquid, collapsing fully the said bellows, and introducing a compressible fluid into said space until a predetermined pressure load is exerted upon said bellows.

2. An expansible container comprising a pair of spaced end members, each having an undulating annular inner surface; annular undulating end flexible members attached to each of said spaced end members; and a plurality of similar undulating annular flexible members each attached alternately to the inner and outer peripheries of adjacent flexible members, said intermediate flexible members being adapted, upon the movement of one end piece towards the other, to be contiguous over their surface with the adjacent flexible member, and said end flexible members adapted to be contiguous over their entire surface with the end members to which they are attached.

3. A bellows device comprising: a pair of spaced rigid circular end members, the opposed surfaces of said end members having at least one and a half undulations, the surface of one end member being complementary to the surface of the other end member; and a plurality of annual flexible members having radial undulating surfaces, one of which is similar to said undulated surface of one of said end members and one of which is similar to the facing surface of the other end member, positioned intermediate the opposing surfaces of said end members, each of said plurality of flexible members attached alternately to the inner and outer peripheries of adjacent flexible members, a periphery of the two end flexible members being attached to the corresponding portion of the adjacent rigid end member; said intermediate flexible members being adapted upon the movement of one rigid end member toward the other, to be in full surface contact with the adjacent flexible member, and rigid end members adapted to be in full surface contact with the end flexible members to which they are attached.

4. An expansible bellows comprising: a pair of spaced rigid circular end members, the opposing surfaces of said end members being arranged substantially transverse to the bellows axis and comprising flat concentric spaced inner and outer zones lying in planes perpendicular to the bellows axis, the surface intermediate said inner and outer zones having a plurality of radially successive annular zones the surface of each zone being curved with the surface of adjacent curved zones being reversely curved, said surface on one end member being complementary to the surface of the other end member; and a plurality of opposing annular flexible members having surfaces, one of which is similar to said opposing surface of one of said rigid end members and one of which is similar to said opposing surface of the other rigid end member, positioned intermediate the opposing surfaces of said rigid end members, each of said plurality of flexible members attached alternately to the inner and outer flat zones of adjacent flexible members, the flat outer zone of the two end flexible members being attached to the corresponding portion of the adjacent rigid end member; each of the intermediate ones of said flexible members being adapted, upon the movement of one of said rigid end members toward the other, to be contiguous over their surfaces with the adjacent flexible members, and the end flexible members being adapted to be contiguous over their surface with the rigid end members to which they are attached.

5. The bellows according to claim 4 wherein one of said rigid end members is imperforate, the other of said rigid end members having an aperture to permit the flow of fluid into and out of said bellows.

References Cited in the file of this patent

UNITED STATES PATENTS

| Number | Name | Date |
|--------|------|------|
| 841,791 | Lemp | Jan. 22, 1907 |
| 1,875,732 | Holttum | Sept. 6, 1932 |
| 1,978,233 | Shanklin | Oct. 23, 1934 |
| 2,385,016 | Mercier | Sept. 18, 1945 |
| 2,411,315 | Ashton | Nov. 19, 1946 |
| 2,460,121 | Brielmaier | Jan. 25, 1949 |